UNITED STATES PATENT OFFICE.

WILLIAM H. DURKEE, OF CINCINNATI, OHIO, ASSIGNOR TO HIMSELF AND GEORGE MARSHALL, OF SAME PLACE.

COMPOUND FOR PRESERVING BELTS AND PREVENTING THEIR SLIPPING.

SPECIFICATION forming part of Letters Patent No. 277,017, dated May 8, 1883.

Application filed June 5, 1882. (Specimens.)

*To all whom it may concern:*

Be it known that I, WILLIAM H. DURKEE, of Cincinnati, Hamilton county, Ohio, have invented a new and Improved Compound for Preserving Belts and Preventing their Slipping, of which the following is a full, clear, and exact description.

My improved compound consists of the following ingredients, combined in the following proportions: tallow, eight and three-fourths parts; light rosin, ten parts; best castor-oil, fifteen parts. The tallow and the rosin are placed in an iron kettle and heated to 250° Fahrenheit. The castor-oil is then added and well mixed. When the temperature of the mixture is 210° Fahrenheit it is removed from the fire, strained through muslin, and poured into tin pails, jars, or other vessels of suitable sizes, and is stirred until it is cold, or nearly so, and will be ready for use in about ten hours.

This compound is very adhesive and prevents the belts from slipping, keeps them soft and pliable, so that they will lie very close on the pulleys, and will thereby produce an even speed of the machinery. The belts will not become hard and will not crack, but will always retain their elasticity.

This compound fills the pores of the leather and checks and prevents decay.

Having thus described my invention, I claim as new and desire to secure by Letters Patent—

The described composition for preserving belts and preventing their slipping, consisting of tallow, light rosin, and castor-oil, compounded in the proportions set forth.

WILLIAM H. DURKEE.

Witnesses:
 NICHOLAS J. MORTON,
 FRANK. H. WARNEFELDT.